US008938339B2

(12) United States Patent
Herter et al.

(10) Patent No.: US 8,938,339 B2
(45) Date of Patent: Jan. 20, 2015

(54) METHOD FOR ACTIVATING A UNIT OF A TRANSMISSION

(75) Inventors: Peter Herter, Ravensburg (DE); Rupert Kramer, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 460 days.

(21) Appl. No.: 13/187,044

(22) Filed: Jul. 20, 2011

(65) Prior Publication Data

US 2012/0072082 A1    Mar. 22, 2012

(30) Foreign Application Priority Data

Sep. 22, 2010 (DE) .......................... 10 2010 041 187

(51) Int. Cl.
| F16H 61/00 | (2006.01) |
| G06F 17/00 | (2006.01) |
| F16H 61/28 | (2006.01) |
| F16D 48/06 | (2006.01) |
| F16D 48/02 | (2006.01) |
| F16H 61/12 | (2010.01) |

(52) U.S. Cl.
CPC ................. F16H 61/28 (2013.01); F16D 48/06 (2013.01); *F16D 2048/0275* (2013.01); *F16D 2500/50296* (2013.01); *F16D 2500/50676* (2013.01); *F16D 2500/70488* (2013.01); *F16H 2061/122* (2013.01)
USPC .................. 701/51; 701/58; 701/59; 477/34; 477/36; 91/519; 91/530

(58) Field of Classification Search
USPC ........ 701/51, 58, 59; 477/34, 36; 91/519, 530
See application file for complete search history.

(56) References Cited

U.S. PATENT DOCUMENTS

| 2,101,829 | A | * | 12/1937 | Benedek .......................... 91/498 |
| 4,095,486 | A | * | 6/1978 | Ohnuma .......................... 477/64 |
| 7,614,335 | B2 | * | 11/2009 | Gradea ............................ 91/444 |
| 8,002,100 | B2 | * | 8/2011 | Herter et al. ................ 192/85.56 |
| 8,051,764 | B2 | * | 11/2011 | Jacobsen et al. ................. 91/519 |
| 8,137,237 | B2 | * | 3/2012 | Staudinger et al. ............. 477/34 |
| 2008/0242507 | A1 | | 10/2008 | Herter et al. |
| 2009/0005942 | A1 | * | 1/2009 | Wiencek et al. ................ 701/58 |
| 2010/0326542 | A1 | * | 12/2010 | Xie et al. .................... 137/487.5 |
| 2012/0225748 | A1 | * | 9/2012 | Michel et al. ................. 475/331 |

FOREIGN PATENT DOCUMENTS

WO    2007/022889 A2    3/2007

* cited by examiner

*Primary Examiner* — Jack W Keith
*Assistant Examiner* — Chuong P Nguyen
(74) *Attorney, Agent, or Firm* — Davis & Bujold, PLLC; Michael J. Bujold

(57) ABSTRACT

A method of actuating an assembly of a transmission, with which are associated a plurality of actuators with whose help the assembly can in principle be actuated, such that out of the actuators available in principle for actuation, a control unit selects at least one actuator for the actual actuation and activates the selected actuator with an output signal in such manner that a status parameter of the actuated assembly corresponds to or follows a control-side nominal value, such that out of the actuators available in principle for actuating the assembly, the control unit selects at least one actuator for the actual actuation of the assembly in such manner that, for all the actuators available in principle for actuating the assembly over the operating life of the transmission, the extent of their utilization is approximately uniform.

12 Claims, 3 Drawing Sheets

METHOD FOR ACTIVATING A UNIT OF A TRANSMISSION

This application claims priority from German patent application serial no. 10 2010 041 187.6 filed Sep. 22, 2010.

FIELD OF THE INVENTION

The invention concerns a method for actuating an assembly of a transmission.

BACKGROUND OF THE INVENTION

From WO 2007/022889 A2 an assembly of a motor vehicle transmission is known which can be actuated with the help of actuators. The assembly of the motor vehicle transmission to be actuated according to this prior art is a clutch, which can be actuated with the help of actuators in the form of valves. A control unit designed as a regulator provides an output signal for the control of actuators in such manner that a status parameter of the assembly to be actuated corresponds to or follows a nominal value determined by the control unit.

From WO 2007/022889 A2 it is further known that a plurality of actuators are associated with the assembly to be actuated, which serve to actuate the assembly to be actuated in the same manner. Thus, according to this prior art the control cylinder of the clutch to be actuated has associated with it, on the one hand, a plurality of inlet valves and, on the other hand, a plurality of outlet valves, the two inlet valves and the two outlet valves serving to actuate the control cylinder in the same way, namely in such manner that the control cylinder can be displaced in a first direction by the plurality of inlet valves and in an opposite, second direction by the plurality of outlet valves. According to this prior art, the two inlet valves and the two outlet valves have different flow cross-sections, such that depending on a desired displacement direction and a nominal value provided by the control unit for the status parameter of the control cylinder, the output signal from the regulator actuates either exclusively one of the inlet valves and one of the outlet valves, or both inlet valves and both outlet valves in combination.

The various actuators are used with different frequency and therefore stressed to different extents. Actuators subjected to the greatest utilization, therefore sustaining the highest wear, determine the total operating duration of the assembly to be actuated. To increase the operating life available each of the most frequently utilized actuators must be designed and sized with regard to the maximum stress it is expected to sustain, whereby higher costs are incurred.

SUMMARY OF THE INVENTION

Starting from here, the purpose of the present invention is to provide a new type of method for actuating an assembly of a transmission. According to the invention, from the actuators available in principle for actuating the assembly, the control unit selects at least one actuator to actuate the assembly in such manner that, over the operating life of the transmission, all the actuators available in principle for actuating the assembly are utilized to an approximately uniform extent.

With the present invention it is proposed for the first time that a control unit, for example a regulator, selects from among the actuators available in principle for actuating the assembly, at least one actuator to actually actuate the assembly in such a way that, considered over the operating life of the transmission, all the actuators will be utilized to an approximately uniform extent. If care is taken to utilize the actuators available to a uniform extent, then actuators which are, according to the prior art, utilized most frequently can be designed smaller and therefore more inexpensively, or alternatively, in this way the available operating life can be extended. This too has benefits.

In an advantageous further development of the invention, for each actuator available in principle for actuating the assembly, in relation to the status parameter to be influenced at least one working range is defined, in which the actuator concerned can be used in principle for influencing the status parameter either alone and/or in combination with at least one other actuator, such that from this, redundant working ranges are determined in each of which at least two actuators can be used in principle, and such that within a redundant working range, of the actuators available in principle in the redundant working range concerned at least one actuator is selected for the actual actuation in such manner that, over the operating life of the transmission, all the actuators are utilized to an approximately uniform extent. The definition of redundant working ranges in which, in principle, a plurality of actuators are available for actuation, allows a particularly preferred uniformity of the utilization of actuators.

Preferably, over the past operating duration of the transmission at least one stressing characteristic is determined for each actuator available in principle for actuating the assembly, which corresponds to the utilization of the actuator concerned up to that time, and within a redundant working range the stressing characteristics of the actuators available in principle in the redundant working range concerned for actuating the assembly are compared with one another, so that on the basis of this comparison at least one actuator with the least previous utilization is preferably selected for the actual actuation. The determination of at least one stressing characteristic for each actuator and the evaluation of the, or of each stressing characteristic in the respective redundant working range of the corresponding actuators allows a particularly preferred, uniform utilization of the actuators.

BRIEF DESCRIPTION OF THE DRAWINGS

Preferred further developments of the invention emerge from the description below. An example embodiment of the invention, to which it is not limited, is explained in greater detail with reference to the drawing, which shows.

DETAILED DESCRIPTION OF THE PREFERRED EMBODIMENTS

The invention concerns a method for actuating an assembly of a transmission, for example a control cylinder of a clutch of a transmission.

Figure 1:
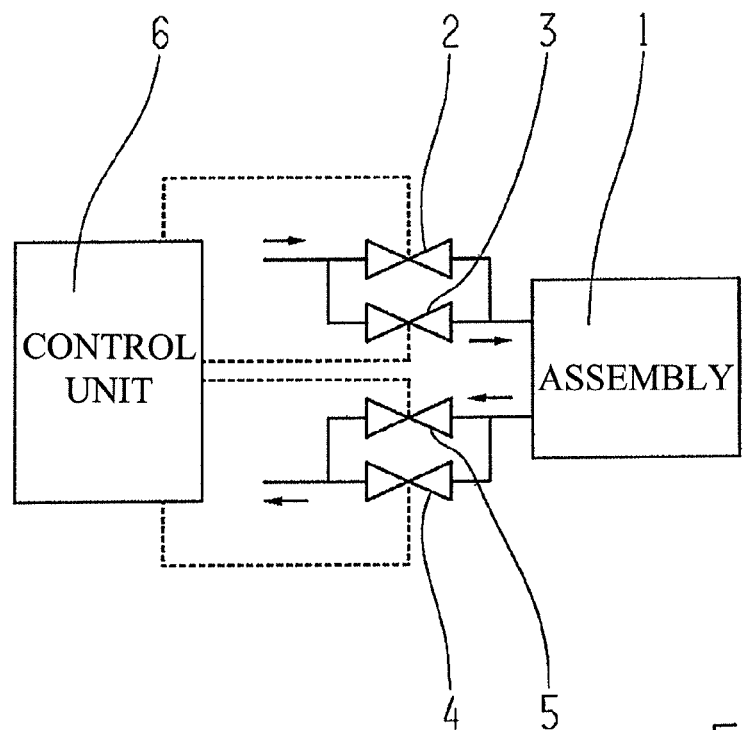
FIG. 1: A schematic arrangement of an assembly, several actuators and a control unit.

FIG. 1 shows, in very schematic form, an assembly 1 of a transmission that is to be actuated, this being for example a control cylinder of a clutch to be actuated. For the actuation of the assembly 1, a plurality of actuators are associated with it in step 10 of FIG. 4, namely actuators 2 and 3 in the form of inlet valves and actuators 4 and 5 in the form of outlet valves. Thus, to actuate the assembly 1 in both actuation directions there are available, respectively, two actuators 2 and 3 or 4 and 5, so that for actuation in the two actuation directions redundant actuators are present. In principle the redundant actuators serve to enable uniform actuation of the assembly 1 to be actuated, although they may differ as regards their dimensions. Thus, the inlet valves 2 and 3 and the outlet valves 4 and 5 can have different cross-sections.

To actuate the assembly 1 by means of the actuators 2, 3, 4 and 5, a control unit 6 provides an output signal in order to control the actuators 2, 3, 4 and 5 in such a manner that a status parameter of the assembly to be actuated corresponds to or follows a control-side nominal value. For the control cylinder shown in FIG. 1 this status parameter is for example its set position. By actuating the valves 2 to 5 by means of the control unit 6, the set position can be influenced, such that by means of one or both of the inlet valves 2, 3, the set position is adjusted in a first direction and by means of one or both of the outlet valves 4 and 5 it is adjusted in a second, opposite direction.

In the context of the invention it is proposed that of the actuators available in principle for actuating the assembly 1, the control unit 6 selects at least one actuator for actuating the assembly 1 in such manner that, for all the actuators available in principle for actuating the assembly 1, over the operating life the actuators are utilized to an approximately uniform extent.

For the example shown in FIG. 1, in which the assembly 1 to be actuated is in the form of a control cylinder with which are associated two inlet valves as redundant actuators 2 and 3 for actuating it in a first direction and two outlet valves as redundant actuators 4 and 5 for actuating it in a second direction, this means that when the assembly 1 to be actuated, as a control cylinder, is to be actuated in the first direction, out of the actuators 2 and 3 available in principle for actuating it in the first direction, the control unit 6 will ultimately select and activate one of the actuators 2 or 3, or both actuators 2 and 3 in combination, but in such manner that over the operating life the extent to which the actuators 2 and 3 are utilized is uniform.

If the assembly 1 in the form of a control cylinder is to be actuated in the second direction, then in principle the actuators 4 and 5 are available for its actuation, and again, out of these actuators 4 and 5 available in principle for actuating the assembly 1, the control unit 6 will actually select and activate either exclusively the actuator 4, or exclusively the actuator 5, or both actuators 4 and 5 in combination, so that again over the operating life of the transmission the extent to which these redundant actuators 4 and 5 are utilized is approximately uniform.

Further details of the method according to the invention are described below with reference to FIGS. 2 and 3, namely for the redundant actuators 2 and 3, such that in FIGS. 2 and 3, for the actuators A by virtue of a status parameter ZG of the assembly 1 to be actuated, for the actuators 2 and 3 available in principle for actuating the assembly 1 working ranges are defined in step 12 of FIG. 4 in relation to the status parameter ZG to be influenced, within which, to influence the status parameter ZG, the respective actuator 2 or 3 can in principle be used alone and/or in combination with at least one further actuator.

Figure 2:
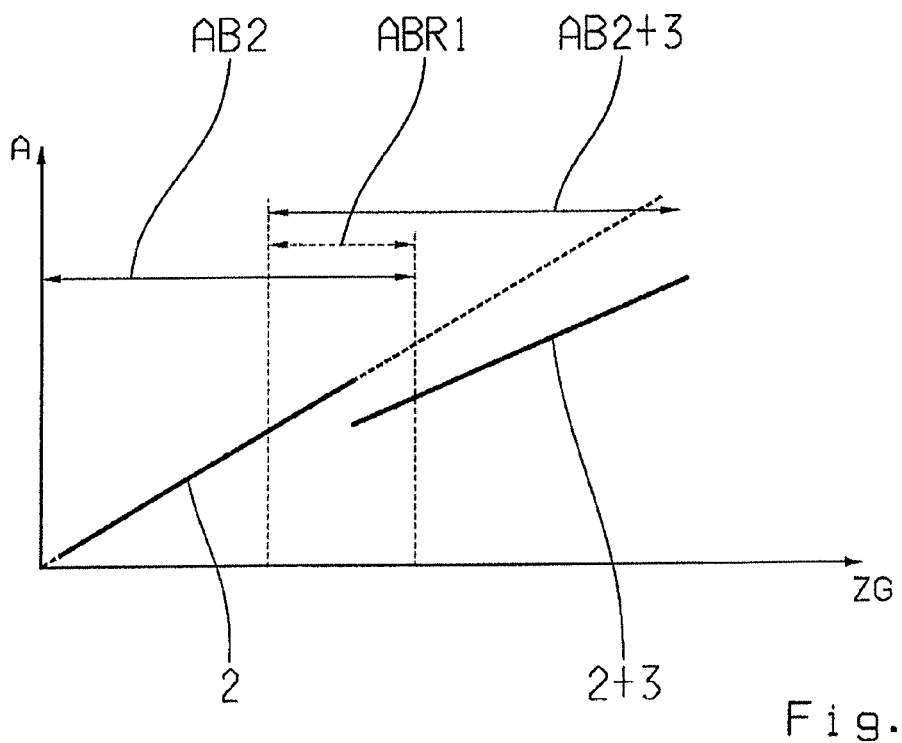
FIG. 2: A first diagram to illustrate a first variant of the method according to the invention for actuating an assembly of a transmission.

In FIG. 2 the actuator 2 can in principle be used for influencing the status parameter ZG alone, and also in combination with the actuator 3. In contrast, in FIG. 2 the actuator 3 can in principle only be used in combination with the actuator 2 for influencing the status parameter ZG.

Figure 3:
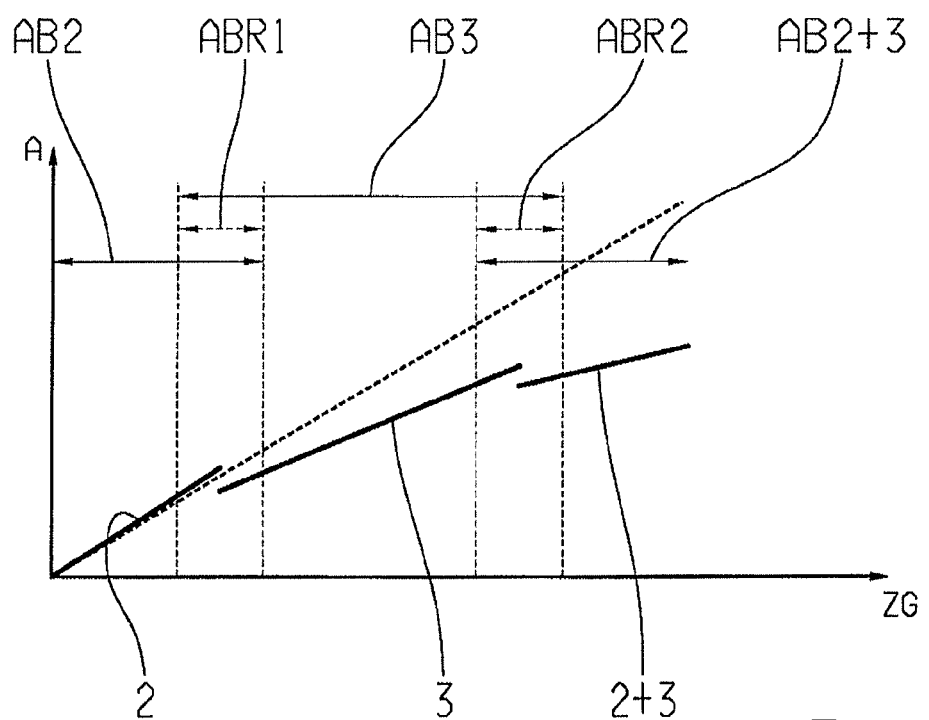
FIG. 3: A second diagram to illustrate a second variant of the method according to the invention for actuating an assembly of a transmission.

In contrast, in FIG. 3 both of the actuators 2 and 3 can in principle be used alone, and also in principle in combination with one another for influencing the status parameter.

Thus, in the variant of FIG. 2, for influencing the status parameter ZG of the assembly 1 to be actuated, in a lower adjustment range of the status parameter ZG in principle exclusively the actuator 2 alone is available, this working range AB2 for the actuator 2, in which it is alone available for influencing the status parameter ZG, being indicated in FIG. 2 by a double arrow. In an upper adjustment range of the status parameter ZG, in the variant of FIG. 2 the combination of both actuators 2 and 3 is available, and the working range in which both actuators 2 and 3 in combination with one another are in principle available for influencing the status parameter ZG is indicated in FIG. 2 by AB2+3.

Figure 4:
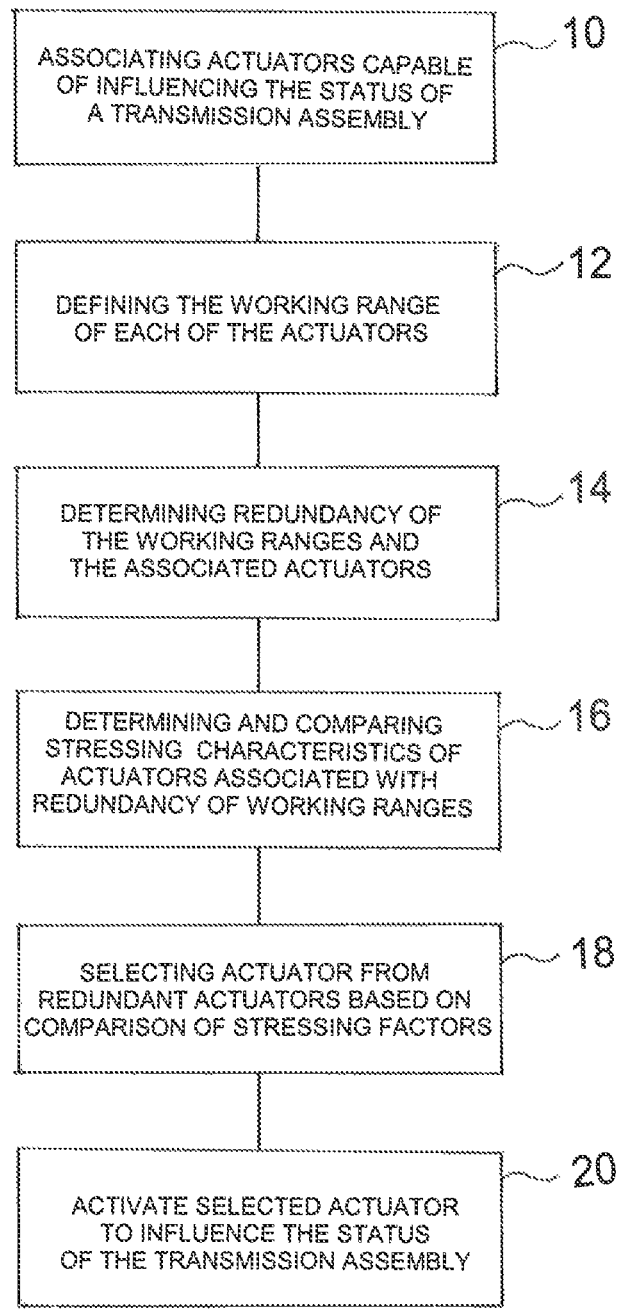
FIG. 4: A flow diagram to illustrate method of the method according to the invention for actuating an assembly of a transmission.

From these working ranges AB2 and AB2+3, in the variant of FIG. 2 a redundant working range ABR1 is determined in step 14 of FIG. 4 in which, for actuating the assembly 1, in principle a plurality of actuators are available, namely in FIG. 2 in such manner that in the redundant working range ABR1 relating to the status parameter ZG, the status parameter ZG can be influenced either by the actuator 2 alone, or alternatively by a combination of actuator 2 and actuator 3.

According to the invention, in the redundant working range ABR1, the control unit 6 selects actuator 2 alone or actuator 2 in combination with actuator 3 for the actual actuation of the assembly 1, namely in such manner that over the operating life of the transmission the actuators 2 and 3 are utilized to an approximately uniform extent. When both actuators 2 and 3 in combination together with one another are selected for actuating the assembly 1, then compared with the case when the actuator 2 alone is selected for actuating the assembly 1, the stressing of the actuator 2 is reduced.

To be able to effect the selection of actuators available in principle in the redundant working range ABR1 in a simple and reliable manner, for each actuator available in principle for actuating the assembly 1 at least one stressing characteristic is determined in step 16 of FIG. 4, which corresponds to the previous utilization of the actuator concerned. This stressing characteristic can for example be determined on the basis of the number of switch-on cycles of an actuator, on the basis of the cumulative activation time of an actuator, or the like.

Within a redundant working range, the stressing characteristics of the actuators available in principle in the redundant working range concerned for actuating the assembly 1 are compared in step 18 of FIG. 4 with one another, and on the basis of this comparison at least one of the actuators is selected in step 18 of FIG. 4 for the actual actuation, namely that actuator with the least previous utilization.

In relation to the example embodiment of FIG. 2 this means that both for the actuator 2 and for the actuator 3, at least one respective stressing characteristic is determined, which corresponds to the previous utilization of the actuators 2 or 3 concerned. In the redundant working range ABR1 the respective stressing characteristics are then compared with one another and if, in the redundant working ranges ABR1, the or each stressing characteristic of actuator 2 is lower in comparison with that of actuator 3, i.e. if compared with actuator 3, actuator 2 has undergone less previous utilization, then actuator 2 alone is selected in the redundant working range ABR1 for actuating the assembly 1. On the other hand, if the previous utilization of actuator 2 is greater than that of actuator 3, then in the redundant working range ABR1 the actuator 2 is selected in combination with the actuator 3 for actuating the assembly 1, since in that case the stressing of actuator 2 can be reduced compared with when it is selected alone.

In the example embodiment of FIG. 3, in which working ranges AB2 and AB3 are defined for actuator 2 and for actuator 3 as well, in which the two actuators 2 and 3 are each in principle available alone for actuating the assembly 1 to be actuated, two redundant working ranges ABR1 and ABR2 are defined, such that in the redundant working range ABR1 both the actuator 2 alone and also the actuator 3 alone are available in principle for actuating the assembly 1 to be actuated, and such that in the redundant working range ABR2 on the one hand the actuator 3 alone and on the other hand the actuators 2 and 3 in combination with one another are available for actuating the assembly 1. If, when compared with actuator 3, on the basis of its determined characteristic the actuator 2 shows less previous utilization, then in the redundant working range ABR1 preferably the actuator 2 and in the redundant working range ABR2 preferably the actuator 2 in combination with the actuator 3 is selected for actuating the assembly and is accordingly activated, in order to relieve the load on the actuator 3. In contrast, if when compared with actuator 3 the actuator 2 shows greater previous utilization, then in the redundant working range ABR1 preferably the actuator 3 and in the redundant working range ABR2 preferably the actuator 3 again, in each case alone, is selected for actuating the assembly 1, in each case in order to relieve the stress on the actuator 2.

Thus, with the present invention a method for operating an assembly of a transmission actuated by actuators is proposed, in which uniform utilization of the actuators is achieved by defining redundant working ranges and by determining stressing characteristics. In the context of the invention, redundant working ranges are understood to mean that the status parameter in the assembly can be influenced in a redundant working range by different actuators alone or in combination with one another, differently but in a similar manner.

The limits of the redundant working ranges can be reduced in order to provide a safety gap. Thus in FIG. 2 for example, in relation to the status parameter ZG, if the working range AB2 extends between 0 and 50% of the adjustment range of the status parameter ZG and the working range AB2+3 extends between 30 and 100% of the adjustment range of the status parameter ZG, it is possible for the redundant working ABR1, whose concrete limits are then between 30% and 50%, to be reduced by a safety gap of 3% in each case, so that the redundant working range then extends between 33 and 47% of the adjustment range of the status parameter ZG.

In this way the reliability of the method according to the invention can be increased.

The method according to the invention serves to ensure uniform utilization of all the actuators available in principle for actuating an assembly. This makes it possible either to make the actuators smaller, or to ensure that they have a longer operating life. In either case cost benefits are achieved thereby.

INDEXES

1 Assembly
2 Actuator
3 Actuator
4 Actuator
5 Actuator
6 Control unit

The invention claimed is:

1. A method of actuating a component of a transmission assembly, the component being actuatable by a plurality of actuators, the plurality of actuators being controllable by a control unit, the control unit activating at least one selected actuator of the plurality of actuators with an output signal, the at least one selected actuator of the plurality of actuators being activated to actuate the component and adjust a status parameter of the actuated component, the method comprising the steps of:

selecting, with the control unit, the at least one selected actuator from the plurality of actuators, transmitting the output signal, from the control unit to the at least one selected actuator of the plurality of actuators to actuate the component of the transmission assembly, and selecting the at least one selected actuator, with the control unit, from the plurality of actuators, based on a comparison of relative duration of prior utilization of each of the plurality of actuators so as to uniformly actuate each of the plurality of actuators during utilization of the transmission.

2. The method according to claim 1, further comprising the step of defining, for each of the plurality of actuators, a working range of the status parameter, over which the respective actuators of the plurality of actuators actuate the component to adjust the status parameter of the component either alone or in combination with at least one additional actuator, and determining at least one redundant working range, over which at least two actuators of the plurality of actuators actuate the component to adjust the status parameter of the component.

3. The method according to claim 2, further comprising the step of selecting the at least one selected actuator from the at least two actuators of the plurality of actuators that actuate the component to adjust the status parameter of the component over the redundant working range, and the at least one selected actuator of the plurality of actuators for actuating the component of the transmission assembly being selected such that all of the plurality of actuators are approximately uniformly utilized to actuate the component to adjust the status parameter of the component.

4. The method according to claim 1, further comprising the step of determining with the control unit, for each of the plurality of actuators, at least one utilization stress characteristic which corresponds to a total relative duration of prior utilization of the respective actuator.

5. The method according to claim 4, further comprising the step of comparing, with the control unit and within a redundant working range, the utilization stress characteristics of each of the at least one selected actuator of the plurality of actuators that actuate the component in the redundant working range, with one another; and selecting the at least one selected, actuator of the plurality of actuators, based on the comparison, having the lowest total relative duration of prior utilization for actuating the component.

6. The method according to claim 4, further comprising the steps of:

selecting a first selected actuator and actuating the component using only the first selected actuator within a first working range which relates to the status parameter being adjusted;

selecting a second selected actuator and actuating the component using only the second selected actuator within a second working range which relates to the status parameter being adjusted; and selecting and actuating the component using a combination of the first selected actuator and the second selected actuator within a third working range which relates to the status parameter being adjusted, the first and the second working ranges overlap one another and define a first redundant working range, and the second and the third working ranges overlap one another and define a second redundant working range, selecting and actuating the component using only the first selected actuator within the first redundant working range, when the duration of prior utilization of the first selected actuator is lower than the duration of prior utilization of the second selected actuator; and selecting and actuating the component using the combination of the first selected actuator and the second selected actuator within the second redundant working range.

7. The method according to claim 6, further comprising the step of selecting and actuating the component using only the second selected actuator within the first redundant working range and the second redundant working range if the total duration of prior utilization of the first selected actuator is greater than the total duration of prior utilization of the second selected actuator.

8. The method according to claim 4, further comprising the step of selecting and actuating the component within a first working range relating to the status parameter being adjusted, only using a first selected actuator;

selecting and actuating the component within a second working range relating to the status parameter being adjusted, using the first selected actuator in combination with a second selected actuator, and the first and the second working ranges overlapping one another and defining a redundant working range; and selecting and actuating the component within the redundant working range with only the first selected actuator, if the total duration of prior utilization of the first selected actuator is less than the total duration of prior utilization of the second selected actuator.

9. The method according to claim 8, further comprising the step of selecting and actuating the component within the redundant working range with the first selected actuator in combination with the second selected actuator, if the total duration of prior utilization of the first selected actuator is greater than the total duration of prior utilization of the second selected actuator.

10. A method of actuating a transmission component with at least one of a plurality of actuators so as to adjust a set position of the transmission component, the plurality of actuators being connected to and controlled by a control unit which transmits control signals to the plurality of actuators, the method comprising the steps of:

comparing total prior usage values of each of the plurality of actuators with the control unit, the total prior usage values corresponding respectively to a measure of relative wear of each of the plurality of actuators prior to this evaluation;

selecting, with the control unit, the at least one of the plurality actuators for actuating the transmission component so as to adjust the set position of the transmission component based on the comparison of the total prior usage values of the plurality of actuators; and actuating the transmission component with the selected at least one of the plurality of actuators such that the total prior usage value of the first actuator and the total prior usage value of the second actuator are approximately uniform relative to each other over a time period of transmission use.

11. A method of actuating a transmission component to adjust a set position of the transmission component, the transmission component being a control cylinder, at least first and second actuators being connected to the control cylinder, a control unit communicating with the first and the second actuators such that selective activation of the first and the second actuators, via the control unit, controllably actuates the control cylinder to adjust the set position thereof over a range of set positions, the set position of the control cylinder is adjustable over a first range of set positions by actuating the control cylinder with only the first actuator, the set position of the control cylinder is adjustable over a second range of set positions by actuating the control cylinder with both of the first and the second actuators together, the set position of the control cylinder is adjustable over a redundant range of the set positions by actuating the control cylinder either with the first actuator alone or with both of the first and the second actuators together, the redundant range of set positions comprising a portion of each of the first and the second ranges of set positions, the method comprising the steps of:

defining, with the control unit, the first range of set positions of the control cylinder as set positions that are adjustable by actuating the control cylinder with only the first actuator;

defining, with the control unit, the second range of set positions of the control cylinder as set positions that are adjustable by actuating the control cylinder with both of the first and the second actuators together;

determining, with the control unit, the redundant range of set positions of the control cylinder which are set positions that are adjustable by actuating the control cylinder either with the first actuator alone or with both of the first and the second actuators together;

selecting, with the control unit, one of either the first actuator alone or both of the first and the second actuators together to actuate the control cylinder to adjust the set position of the control cylinder when the set position of the control cylinder is within the redundant range of the set positions based on a comparison of cumulative prior operation of the first and the second actuators; and actuating, with the control unit, the control cylinder with the selected one of either the first actuator alone or both of the first and the second actuators together to adapt the set position of the control cylinder when the set position of the control cylinder is within the redundant range of the set positions.

12. The method according to claim 11, further comprising the steps of:

defining the control cylinder as being a control cylinder of a clutch, and defining the first and the second actuators as being first and second valves;

determining, with the control unit, a cumulative prior operation value for each of the first and the second valves, the cumulative prior operation values respectively representing a measure of the total operation of the first and the second valves prior to this determination;

actuating, with the control unit, the control cylinder with the first valve alone to adjust the set position of the control cylinder when the set position of the control cylinder is within the redundant range of the set positions, if the cumulative prior operation value of the first valve is less than the cumulative prior operation value of the second valve; and actuating, with the control unit, the control cylinder with both of the first and the second valves together to adjust the set position of the control cylinder when the set position of the control cylinder is within the redundant range of the set positions, if the cumulative prior operation value of the second valve is less than the cumulative prior operation value of the first valve.

* * * * *